March 10, 1964 R. W. KRAFT 3,124,452
UNIDIRECTIONAL SOLIDIFICATION OF LAMELLAR EUTECTIC ALLOYS
Filed Sept. 30, 1960 4 Sheets-Sheet 1

March 10, 1964   R. W. KRAFT   3,124,452
UNIDIRECTIONAL SOLIDIFICATION OF LAMELLAR EUTECTIC ALLOYS
Filed Sept. 30, 1960   4 Sheets-Sheet 2

March 10, 1964  R. W. KRAFT  3,124,452
UNIDIRECTIONAL SOLIDIFICATION OF LAMELLAR EUTECTIC ALLOYS
Filed Sept. 30, 1960  4 Sheets-Sheet 3

March 10, 1964 R. W. KRAFT 3,124,452
UNIDIRECTIONAL SOLIDIFICATION OF LAMELLAR EUTECTIC ALLOYS
Filed Sept. 30, 1960 4 Sheets-Sheet 4

TO POTENTIOMETER 3,124,452
UNIDIRECTIONAL SOLIDIFICATION OF
LAMELLAR EUTECTIC ALLOYS
Ralph W. Kraft, Glastonbury, Conn., assignor to United
Aircraft Corporation, East Hartford, Conn., a corporation of Delaware
Filed Sept. 30, 1960, Ser. No. 59,556
24 Claims. (Cl. 75—135)

The present invention is directed to new and useful alloys, and more particularly to new and useful alloys having a high degree of microstructural regularity and continuity over substantial volumes, and to methods for producing such alloys.

Objects of the present invention are new polyphase alloys having microstructures in which one or more of the phases is present in the form of very thin three dimensional lamellae, which lamellae are parallel or substantially parallel to a given direction.

A further object of the present invention is a method of producing such alloys.

Other objects of the present invention will be clear from the following description.

According to one embodiment of the present invention, polyphase alloys have been produced having microstructures which consist predominantly of very fine, three-dimensional lamellae, which may be characterized as plates or rods, of one phase imbedded in another phase, said lamellae being substantially parallel to a common direction.

According to another embodiment of the present invention, a method of producing such alloy compositions has been discovered which comprises establishing a liquid-solid interface in the alloy composition and causing the interface to be moved in a unidirectional fashion as the alloy is cooled through an appropriate transformation temperature. In this way, the crystallites of each phase grow or form normal to the interface or solidification front between the transformed and untransformed metal and parallel to the growth direction over as great a distance as is desired. The distance over which the lamellae are parallel to the growth direction may be as great as 1 or 2 feet, or even 1 or 2 meters, or even longer. Further, the parallel microstructure extends throughout substantial volumes of the alloy specimen.

When the lamellae formed are three-dimensional plates or platelets, these may be substantially parallel to one another, as well as parallel or substantially parallel to one another, as well as parallel or substantially parallel to the growth direction throughout the entire volume of the specimen.

The three dimensional plate-like lamellae, however, need not be and frequently are not parallel to one another throughout the entire volume of the specimen.

Thus, for example, the plates or platelets in one volumetric section of the alloy specimen may form an angle with the plates or platelets in an adjoining volumetric section of the alloy specimen. The plates or platelets from section to section in such specimens are, however, parallel to a common direction, even though, from section to section of the microstructure, the plates or platelets may not be substantially parallel to each other. This phenomenon will be described more fully hereinbelow in connection with the drawings.

When the lamellae formed are rods, these are substantially parallel to each other over the entire specimen, as well as substantially parallel to a common direction in the specimen or object.

Regardless of whether rod-like or plate-like lamellae are formed, the lamellae in the microstructure of the products described herein extend in a direction which is normal to or substantially normal to the solidification front.

In the products of the present invention the parallel lamellar microstructure or groundmass is of eutectic composition. A eutectic composition or alloy may be defined as one in which two (or more) types of crystals (e.g. metallurgical phases), freeze simultaneously at a fixed temperature, called the eutectic temperature, upon cooling from the liquid state. Examples of binary eutectics which may be used to form the products of the present invention are cited for illustrative purposes in Table I.

TABLE I

| No. | Alloy System | Phase A | Phase B | Eutectic Temperature, C. | Eutectic Alloy Composition |
|---|---|---|---|---|---|
| 1 | Al—Cu | Al | θ(CuAl₂) | 548 | 67 wgt. percent Al. |
| 2 | Ag—Cu | Ag | Cu | 779 | 28.1 wgt. percent Cu |
| 3 | Cr—C | Cr | Cr₂₃C₆ | 1,498 | 3.2 wgt. percent C. |
| 4 | Ni-B | Ni | Ni₂B | 1,140 | 4 wgt. percent B. |
| 5 | Cu—Sb | Sb | Cu₂Sb | 526 | 76.5 wgt. percent Sb. |
| 6 | Ag—Al | Al | ζ(Zeta) | 566 | 29.5 wgt. percent Al. |
| 7 | Cd—Zn | Cd | Zn | 266 | 17.4 wgt. percent Zn. |
| 8 | Cu—P | Cu | Cu₃P | 714 | 8.4 wgt. percent P. |
| 9 | Cd—Pb | Cd | Pb | 248 | 82.6 wgt. percent Pb. |
| 10 | Bi—Cd | Bi | Cd | 144 | 60.0 wgt. percent Bi. |
| 11 | Cu—O | Cu | Cu₂O | 1,065 | 0.39 wgt. percent O. |
| 12 | Mg—Sn | Mg | Mg₂Sn | 561 | 36.4 wgt. percent Sn. |
| 13 | Pb—Sn | Pb | Sn | 183 | 38.1 wgt. percent Pb. |
| 14 | Sn—Zn | Sn | Zn | 198 | 91 wgt. percent Sn. |
| 15 | Be—Ni | Ni | β(BeNi) | 1,157 | 5.7 wgt. percent Be. |
| 16 | U—Ni | Ni | UNi₅ | 1,110 | 71 wgt. percent Ni. |

It should be understood that the eutectic alloys given in Table I are illustrative and not limiting.

The eutectic compositions or alloys forming the groundmass or microstructures described herein are selected from the class of eutectic alloys which can be controlled by appropriate, preferably solidification, techniques, to give a microstructure which consists of fine three-dimensional lamellae, e.g. plates or rods, of crystals of one of the phases imbedded in another or second phase.

If one of the phases in a two-phase alloy for example, is forced to grow as parallel plate-like lamellae throughout a large specimen, the other phase will automatically grow in the same manner. In this embodiment, the parallel phase lamellae may be referred to as the groundmass of the compositions. Moreover, as has been indicated hereinabove, the groundmass is of eutectic composition. If the alloy is such that one of the phases grows as parallel rod-like lamellae throughout a large specimen, the other phase will form the matrix in which the rods are imbedded. In this case, the rods and the matrix are referred to as the groundmass or alloy of eutectic composition.

Eutectic alloys having the above-described characteristics, i.e.: the ability to form three-dimensional lamellae, such as plates or rods, upon solidification, are especially suitable for the preparation of specimens or useful objects having the new microstructures of the present invention.

The alloys used to make the new and useful products of the present invention may be true eutectic composition, or may deviate from true eutectic composition. In either event, however, the parallel lamellar groundmass is of eutectic composition.

Thus, when the alloys used to make the new and useful products described herein deviate from true eutectic composition, the products still have the parallel lamellar groundmass or microstructure. However, in this embodiment, the microstructures of the products are also characterized by the presence of relatively larger crystals of one of the phases distributed throughout a parallel lamellar eutectic groundmass or microstructure. Those relatively large crystals are known as proeutectic crystals.

For example, taking alloy No. 1 in Table I, if the alloy composition used to make the product or specimen described herein is on the aluminum rich side of the eutectic point, relatively large crystals of aluminum solid solution, as well as parallel lamellae of the Al and $CuAl_2$ phases will form as the alloy is unidirectionally solidified at the interface or solidification front. In this event, proeutectic crystals of the aluminum solid solution will be distributed, either randomly or uniformly throughout the parallel lamellae eutectic groundmass or microstructure of the Al and $CuAl_2$ phases.

Similar results would be obtained, of course, if the alloy composition used to form the products or specimens described herein were on the copper rich side of the eutectic point. The proeutectic crystals in the resulting product in this event, however, would comprise relatively large crystals of the intermetallic compound $CuAl_2$ distributed within the parallel lamellar groundmass of eutectic composition.

As will be clear from the foregoing discussion, alloys deviating from true eutectic compositions may be considered to comprise a eutectic portion, i.e. a portion which undergoes a eutectic reaction as this term is defined herein above, and a proeutectic portion, i.e. a portion which does not undergo a eutectic reaction. When such alloys are used in forming the products of the present invention, the resulting products comprise a parallel lamellar eutectic groundmass or microstructure having distributed therein relatively large proeutectic crystals. The distribution of the proeutectic crystals throughout the parallel lamellar eutectic groundmass may be random or uniform.

The proportion of eutectic in the alloys making up the products of the present invention can vary over wide limits. Preferably, the eutectic portion of the alloys amounts to between about 5 and 100 percent by weight of the alloys. It will be understood that the higher the weight ratio of eutectic to proeutectic in the alloys, the fewer the number of proeutectic crystals in the groundmass there will be. When the proportion of eutectic in the alloy amounts to 100 percent, i.e. a true eutectic alloy composition, the products will contain substantially no proeutectic crystals.

The invention will be described with reference to the accompanying drawings, in which.

Figure 3A:
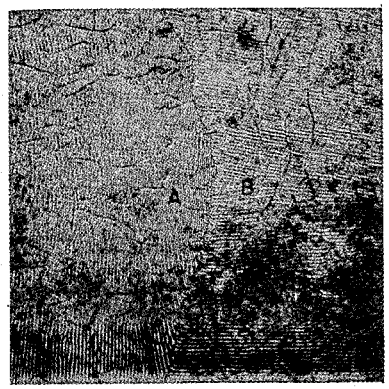
Figure 3B:
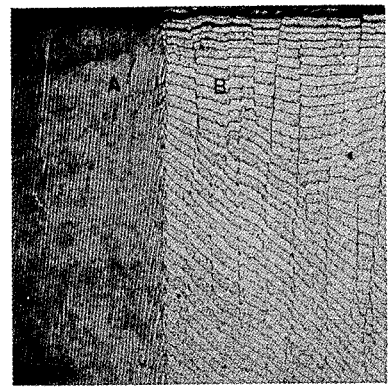

FIGURES 3(a) and 3(b) are photomicrographs (×500) of transverse and longitudinal sections, respectively, of the same microspecimen of a unidirectionally solidified eutectic alloy.

Figure 4A:
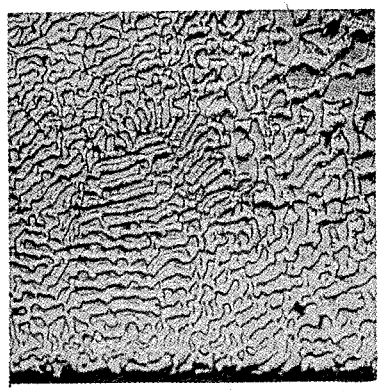
Figure 4B:
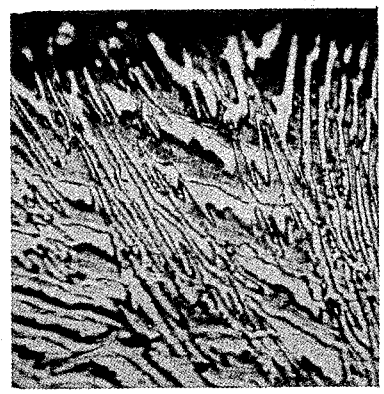

FIGURES 4(a) and 4(b) are photomicrographs (×400) of transverse and longitudinal sections, respectively, of the same microspecimen of a eutectic alloy "as-cast," i.e. a specimen which has not been subjected to unidirectional solidification.

Figure 5:
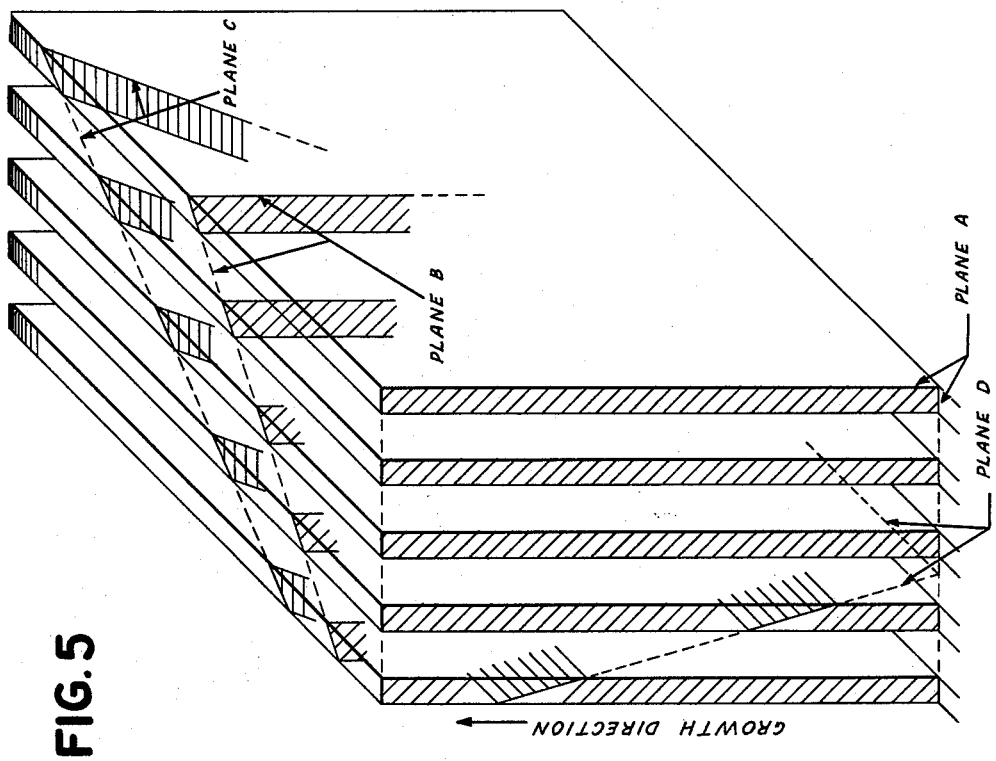

FIGURE 5 is a schematic sketch illustrating dependence of lamellar appearance upon the plane of sectioning of a specimen exhibiting plate-like lamellae.

Figure 6:
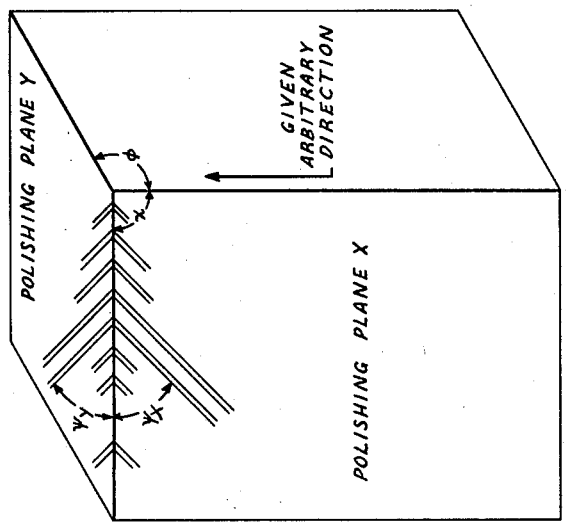

FIGURE 6 is a sketch showing measurements which may be taken to determine the lamellar orientation of a specimen exhibiting plate-like lamellae.

Figure 7:
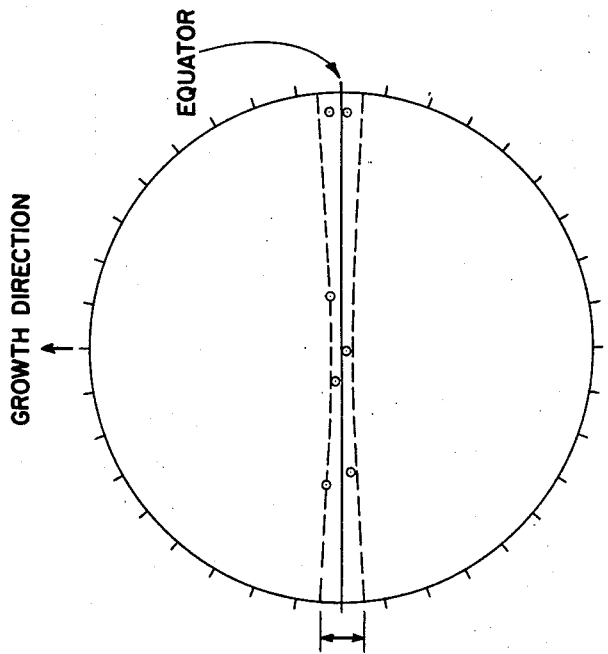

FIGURE 7 is a stereographic projection of lamellar normals of various sections of the specimen shown in FIGS. 3(a), and 3(b) as well as other sections not shown in the photomicrographs. Growth direction on this projection is vertical, and the plane of projection is a longitudinal section.

Figure 8:
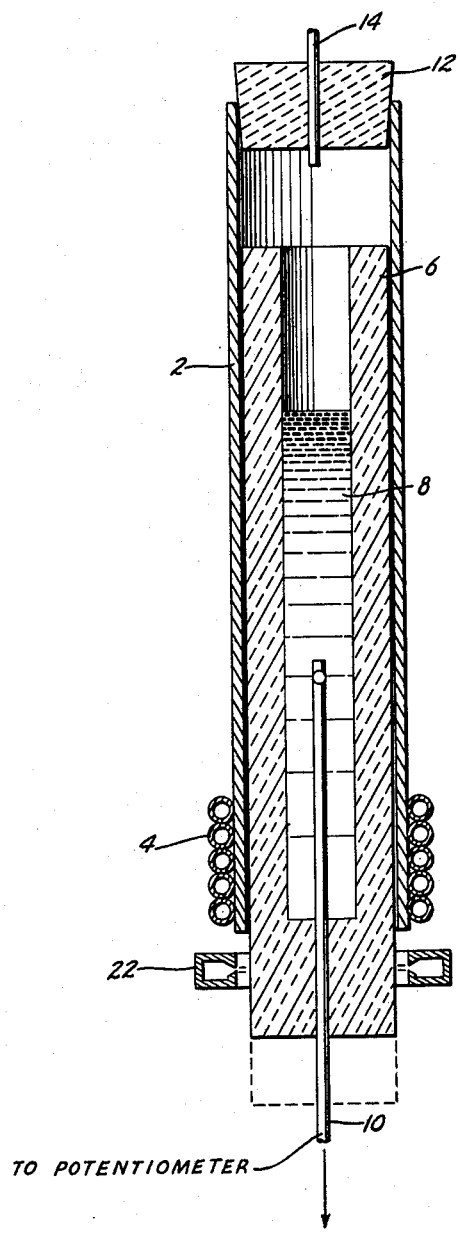

FIGURE 8 is a schematic diagram of an apparatus which may be used in making the alloys of the present invention.

Figure 9A:
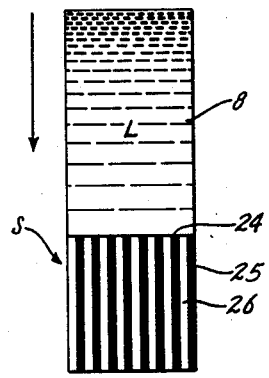
Figure 9B:
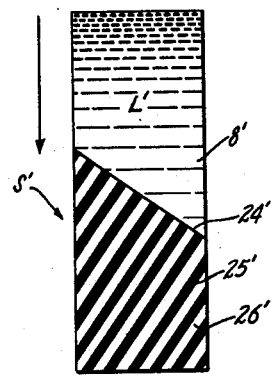

FIGURES 9(a) and 9(b) are schematic diagrams of eutectic alloy specimens undergoing unidirectional solidification.

Figure 10:
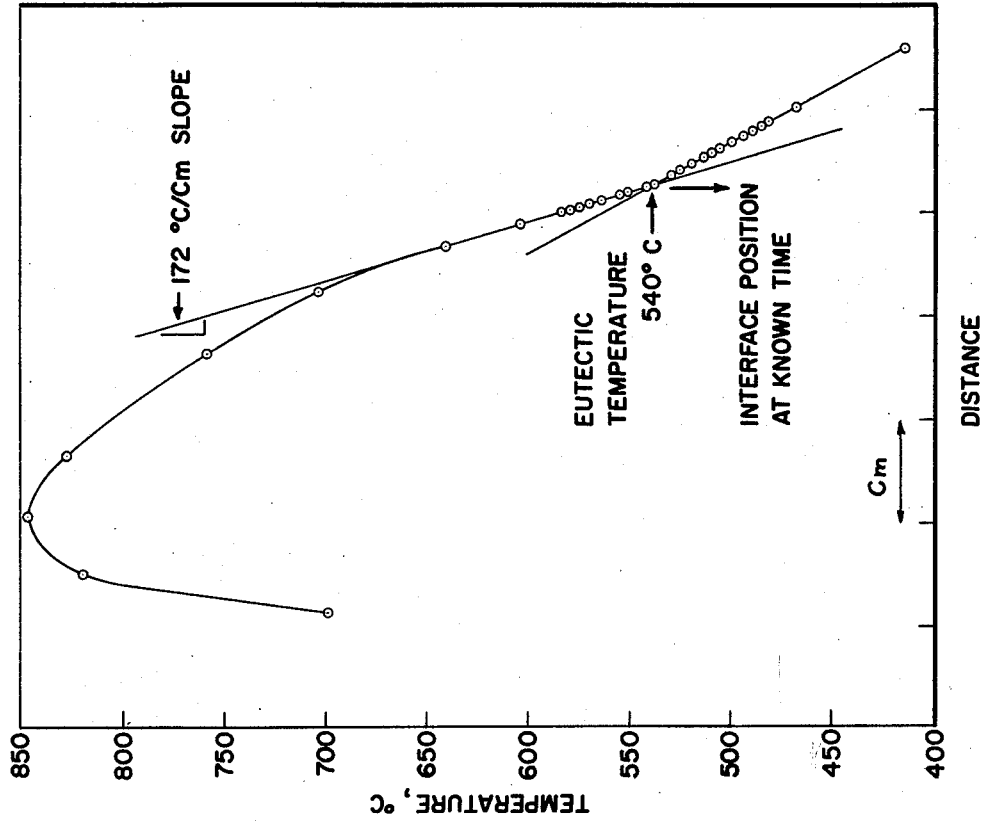

FIGURE 10 is a plot of temperature versus time for a specimen undergoing unidirectional solidification.

Figure 1:
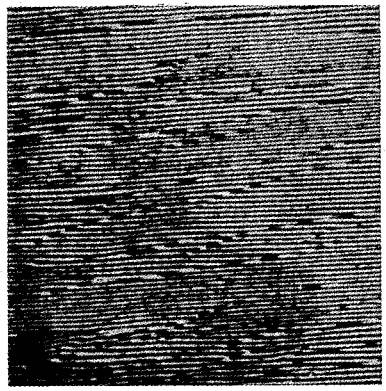
FIGURE 1 is a photomicrograph (×400) of a longitudinal microspecimen of a unidirectionally solidified eutectic alloy.
Figure 2:
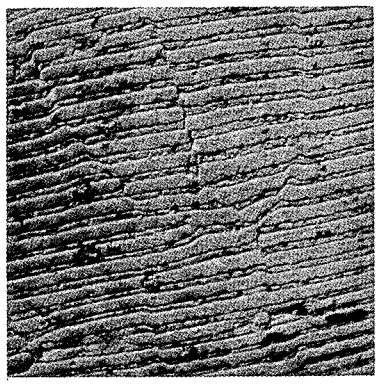
FIGURE 2 is an electron micrograph (×3200) of a transverse microspecimen of a unidirectionally solidified eutectic alloy.

As is apparent from FIGURES 1, 2, 3(a) and 3(b), the microstructures of the alloys of the present invention comprise thin lamellae of one phase which are specifically oriented with respect to thin lamellae of another phase. In FIGURES 1 and 2 for example, all of the lamellae of one phase are parallel or substantially parallel to one another and therefore also parallel or substantially parallel to the lamellae of the other phase of the two phase alloy shown in these figures.

The thin lamellae of each phase are three-dimensional. This is clearly shown in FIGURES 3(a) and 3(b) which represent transverse and longitudinal sections of the same microspecimen. Thus, looking at section A of the microspecimen shown in FIGURES 3(a) and 3(b), it is immediately apparent that the lamellae of each phase are thin three-dimensional plates or platelets which have width, length and thickness.

FIGURE 5 is a schematic illustration of the microstructure shown in FIGURES 3(a) and 3(b), and clearly brings out the three-dimensional nature of the platelets.

Referring again to section A of the microstructure shown in FIGURES 3(a) and 3(b), it is noted that the plate-like lamellae in section A of the microstructure are substantially parallel to each other, and also substantially parallel to a given direction, which for this microspecimen is the direction of the arrow indicated in FIGURES 3(b), which direction is also the solidification direction, since the interface in this specimen was maintained perpendicular to the solidification direction during solidification.

It is also apparent by comparing section A with section B of FIGURE 3(a), that the plate-like lamellae in section B are not parallel to the plate-like lamellae of section A.

Referring to FIGURE 3(b), it also appears that the lamellae of section B are not parallel to the direction indicated by the arrow. Thus, in section B of FIGURE 3(b), which is a photo-micrograph of a longitudinal section of the microspecimen of FIGURE 3(a), it appears as if a series of thick lamellae of first one phase and then the other was formed. A hasty interpretation of this photomicrograph would indicate that section A grew as expected (e.g. parallel plate growth into the liquid), whereas section B grew by alternate deposition of plates of each phase parallel to the liquid-solid interface. The incorrectness of this interpretation is shown by an examination of the same grains in the transverse section of the specimen shown in FIGURE 3(a). Both sections are seen to consist of fine parallel lamellae of approximately the same spacing. The plane of the longitudinal microspecimen (FIG. 3(b)), however, happens to cut section B in such a way that the true nature of the lamellae growth is obscured.

This of course raises the question as to how the lamellae really grew. It will be noticed in FIGURE 5 that the appearance of a series of parallel plates depends very strongly upon the particular polishing plane taken through the specimen. If the plane of the microspecimen is not quite parallel to the growth direction as in planes C and D of FIGURE 5, and/or depending upon how the lamellae happened to grow in a particular section relative to the plane of the microspecimen, all sorts of lamellae structures will be observed. The true metallographic orientation of the plates in any section can only be obtained by measuring the angles at which the plates intersect two intersecting planes, as is brought out in FIGURE 6. The angle between the planes, $\phi$, and the angle $X$ between a given arbitrary direction in one of the planes and the intersection of the two measuring planes must also be known. From these measurements the direction of the plane normals can be determined most easily by means of a stereographic projection. If the lamellae grow into the liquid, the lamellae normals should all lie on the equator of a stereographic projection, the plane of which is a longitudinal section and the axis of which is the growth direction. The results of a stereographic analysis of the sections of the specimen shown in FIGURE 3(a) and FIGURE 3(b) as well as other sections not shown in FIGURE 3 are shown in FIGURE 7 and confirm, within the limits of experimental error, the fact that the lamellae do grow into the liquid parallel to the growth direction in spite of their rather odd appearance in some cases.

In view of the foregoing, it is clear when the microstructures of the unidirectionally solidified alloys of the present invention comprise plate-like lamellae, these lamellae are parallel or substantially parallel to each other within sections of the specimen, and the lamellae from section to section of the specimen are parallel or substantially parallel to the growth direction.

Although not shown in the drawings, when the microstructures of the unidirectionally solidified alloys comprise rod-like lamellae of one phase imbedded in another or second phase, these rod-like lamellae will be parallel or substantially parallel to each other throughout the specimen, and also to the growth direction.

The unique microstructures of the unidirectionally solidified alloys of the present invention lead to unique physical and mechanical properties. For example, the unidirectionally solidified alloys described herein are anisotropic, i.e., the properties are different in different directions. This characteristic makes these alloys especially useful in applications where anisotropic properties are required, for example, in the electrical inudstry. The alloys of the present invention also have unusual strength properties, and certain of these alloys exhibit unexpected magnetic properties, all of which properties make their use in a wide variety of applications highly advantageous.

The microstructure of the unidirectionally solidified eutectic alloys of the present invention may be characterized in terms of the parallelism of the lamellae, i.e. plates or rods, making up the structure of the alloys, and also in terms of the size and shape of the lamellae.

In terms of physical dimensions, when the lamellae are three-dimensional plates, these are extremely thin and have a thickness of about 0.02 to about 20 microns, and usually between about 0.04 and 10 microns. The width of the plate is at least three times the thickness and is generally greater than ten times the thickness. The length of the lamellae is generally greater than the width, and may vary from about 50 microns to 1 or 2 inches or more.

As has been noted hereinabove, these plate-like lamellae are arranged within the specimen so as to be substantially parallel to one another over appreciable distances within a section; and between sections, the plate-like lamellae are substantially parallel to the common growth direction, which, as has been pointed out, is frequently parallel to the solidification direction, but which may be artificially inclined at an angle, depending upon the application.

When the lamellae are rods, these have a diameter of about 0.02 to 20 microns, usually between about 0.02 to 10 microns, and a length which is greater than the diameter, generally greater than 50 microns, and usually between about 100 microns and 1 to 2 inches. As has been noted, hereinabove, these rods are substantially parallel to each other and to the common growth direction throughout the entire specimen.

The parallelism of the phases making up the microstructure of the new alloys described herein may be described by stereographic projection, which is a method applied in the art to describe angles and directions in three dimensions on a two-dimensional sheet of paper. The theory of stereographic projection is described in Barrett, Structure of Metal, first edition, 1943, McGraw-Hill, pages 25 to 43, and in other standard works on geometry and trigonometry.

Briefly, in stereographic projection, planes, axes and angles are conveniently represented on a sphere. The crystal or origin of all planes, axes and angles is assumed to be very small compared with the sphere (known variously as the reference sphere or polar sphere) and to be located exactly at the center of the sphere. Planes of the crystal, or in the present instance, the lamellae in the microstructure of the alloy, can be represented by extending the lamellae until they intersect the sphere in a great circle. The normals to plate-like lamellae can alternately be used. The microspecimen is assumed to be so small that all lamellae pass through the center of the sphere. If all planes of the crystal, or in this instance, if all of the lamellae of each phase are projected upon the sphere in this manner, it will be found that the axes of the rod-like lamellae or normals to the plate-like lamellae bear the same relation to each other as do the lamellae within the microstructure of the alloy, and so exhibit, without distortion, the angular relation of the lamellae within the microstructure.

The parallelism of the lamellae in the microstructure may be designated by a concept called spherical excess, using the method of stereographic projection.

If the lamellae within the microstructure are perfectly parallel, all of the projections of these lamellae (axes for rods, normals for plates) will intersect the sphere at two diametrically opposite points. The stereographic projections of lamellae having this relationship are assigned a spherical excess of 0 percent.

If the arrangement of the lamellae is completely random, the projections will occur in diametrically opposite pairs all over the surface of the sphere. The stereographic projections of such lamellae are said to have a spherical excess of 100 percent.

If, however, the lamellae within the microstructure are not completely parallel, but nearly so, the projections of the lamellae (axes for rods, normals for plates) will intersect the surface of the sphere over a small angular range. Because the projection lines always intersect the sphere at two diametrically opposite points, two diametrically opposite and equal small angular ranges will occur but it is only necessary to consider one of them. The projections of the lamellae in the microstructure, accordingly, are said to have a spherical excess, which is expressed by the percentage of the surface of the hemisphere bounded by the curves connecting the points on the surface of the sphere which extend from the described projections of the lamellae of the microstructure.

The theory of stereographic projection and the concept of spherical excess may be applied to determine the arrangement of the lamellae in the microstructures of a large number of specimens of unidirectionally solidified alloys of the present invention.

When the microstructure of the unidirectionally solidified alloys comprises rods, or rod-like lamellae, as has been described hereinabove, the rods are parallel or substantially parallel to each other and to a given direction, e.g. the growth direction, over the entire specimen.

For specimens having rod-like microstructures, the spherical excess of the stereographic projection of the rods varies within the range of from about 0 to 20 percent, rarely over 10 percent, and usually from about 0 to 5 percent.

Stereographic projection has also been used to measure the orientation of the lamellae of unidirectionally solidified alloys of the present invention having microstructures comprising plate-like lamellae.

Within sections of the specimen, e.g. A or B of FIGS. 3(a) and 3(b), the spherical excess of the stereographic projection of lamellae has been found to be from about 0 to 20 percent, rarely over 10 percent, and usually from about 0 to 5 percent.

When plate-like microstructures exist, the term section or volumetric section refers to a volume of the specimen in which the plate-like lamellae are parallel or substantially parallel to one another, and therefore also parallel or substantially parallel to the lamellae of the other phase of a two phase alloy.

For microstructures comprising plate-like lamellae, the orientation of the plate-like lamellae from section to section has been determined by stereographic projection of the lamellae normals, with respect to the growth direction for a large number of unidirectionally solidified alloys. When the growth direction on the projection is vertical, and using a longitudinal section of the microspecimen, it has been discovered that the stereographic projections of the plate-like lamellae normals deviate from the equator by less than 30°, rarely over 20°, and usually under 5°. This means that the plate-like lamellae deviate from being parallel to the growth direction by the indicated degrees.

FIGURES 4(a) and 4(b) are photomicrographs of transverse and longitudinal microspecimens of an "as cast" alloy, i.e. the alloy has not been subjected to unidirectional solidification. The alloy used in making the product shown in FIGS. 4(a) and 4(b) is the same as the alloy used in making the products shown in FIGS. 1 to 3 inclusive. Comparing FIGS. 1, 2, 3(a) and 3(b) with FIGS. 4(a) and 4(b) it is obvious that the microstructures are radially different. Thus, in FIGS. 4(a) and 4(b) crystal growth started at many points and grew outward in all directions within the liquid, and a random, overall structure was produced. The orientation of the lamellae as is shown in FIGS. 4(a) and 4(b) varies from area to area. In terms of spherical excess, the stereographic projections of the lamellae in the specimen whose microstructure is shown in FIGS. 4(a) and 4(b) would have a spherical excess approaching 100 percent, i.e. completely random.

The method of forming the eutectic alloys of the present invention will be described in connection with FIGURES 8, 9 and 10.

As shown in FIGURE 8, a typical apparatus comprises a hollow, tubular induction furnace 2 having heating coils 4 suitably attached to a power source, not shown. Slideably mounted within the induction furnace is a crucible 6, which holds the specimen 8. Projecting upwardly through the bottom of the crucible and into the specimen is a thermocouple 10.

The induction furnace may, if desired, be equipped with a closure member 12 which is fitted with a tube 14, through which may be admitted an inert bleed gas, such as argon, krypton, neon and so forth.

Crucible 6 is fitted with a suitable drive mechanism (not shown) to pull the crucible through the furnace. The drive mechanism is readily adjustable to change the rate at which the crucible is drawn through the induction furnace.

Spaced below the induction furnace and surrounding the crucible is cooler 22 through which a suitable cooling fluid is passed and projected or sprayed upon the surface of the crucible as it passes therethrough.

The following examples describe methods of making the alloy compositions of the present invention. Though illustrative, it should be understood that the invention is not limited to the specific method or apparatus described, but is broad enough to encompass all methods and apparatus which will be obvious to those skilled in the art from the description herein.

*Example I*

An aluminum-copper binary eutectic composition which solidified as aluminum solid solution and a θ (CuAl$_2$) phase was used in carrying out this example. The eutectic temperature of this alloy was 548° C.

High-purity copper (est. 99.999% Cu obtained from National Research Corp.) and spectrographic aluminum rods, having impurities other than copper estimated to be Zn—15 p.p.m., Mg—10 p.p.m., Fe—3 p.p.m., Na—2 p.p.m., Cd—1 p.p.m., and Mn less than 1 p.p.m., were melted in a stabilized zirconia crucible in a vacuum induction furnace at a pressure of 10 microns of Hg. The melt was superheated to about 1000° C. to assure mixing, cooled to 780° C. and cast into an investment mold which yielded sixteen cylindrical specimen blanks ½ in. in diameter and 5½ in. long. The casting was allowed to solidify under vacuum. This master heat had an analysis of 32.6 weight percent Cu and 67.4 weight percent Al, by difference.

A cylindrical specimen blank produced as above was remelted and solidified unidirectionally in the apparatus indicated schematically in FIGURE 8. The induction furnace 2 consisted of a Vycor tube fitted at its bottom with a 5½ turn RF induction load coil. A tubular crucible of CS graphite, 0.83 inch in diameter, drilled to hold the ½ inch in diameter, and 5½ inches long, specimen was slideably mounted in the Vycor tube. The graphite crucible was drawn through the furnace in the direction of the arrow shown in FIGURE 8 by a suitable drive mechanism (not shown).

Power to the induction coil was turned on, and water was fed to the quenching fixture. Argon gas was admitted to the Vycor tube, as shown in the drawing, to minimize oxidation of the melt. The heat input of the induction coils and the temperature and rate of water flow to the quenching fixture or water cooler was regulated to produce a solid-liquid interface in the specimen which extended across the entire cross-sectional area of the specimen in a direction substantially transverse to the direction of motion of the graphite crucible.

The drive mechanism for the graphite crucible was turned on, and the crucible was drawn through the Vycor tube at a pre-determined rate.

Temperature gradients in the liquid and the location of the liquid-solid interface were determined by recording and plotting the temperature of a thermocouple bead as a function of the distance that the crucible had travelled.

The temperature of the liquid and the thermal gradient at the interface were controlled by appropriately adjusting the power input to the induction coil, the quantity of water used, and the rate of unidirectional movement of the crucible.

FIGURE 9(a) is a schematic diagram of the specimen as it is being subjected to unidirectional solidification. As is shown in FIGURE 9(a) the solid-liquid interface 24 extends across the cross-sectional area of the specimen, and in a direction transverse to the unidirectional movement of the specimen in this example.

The thermal gradient, G, in the liquid at the liquid-solid phase, was determined by recording and plotting the temperature of a thermocouple bead as a function of the distance that the movable part of the apparatus had travelled. This curve is shown in FIGURE 11. The temperature gradient, in the liquid, immediately in front of the interface, as determined by the slope of the curve, for this run was 172° C./cm.

The rate of solidification, R, was determined from the number of centimeters of solidified alloy formed, and the time required for formation. For this run, the solidification rate was 6.70 cm./hr.

The ratio of $G/R$, therefore, was 25.6° C./cm.$^2$/hr.

The microstructure of the unidirectionally solidified alloy produced comprised plate-like lamellae of the aluminum solid solution alternating with plate-like lamellae of the θ phase (approximate composition CuAl$_2$), the lamellae being substantially parallel within sections of the specimen, and substantially parallel to the solidification direction throughout the specimen.

FIGURES 1, 2, 3(a) and 3(b) are photomicrographs of the microstructure of the specimen. These illustrations have already been adequately described hereinabove.

Specimens were prepared in which the plate-like lamellae were approximately parallel to the solidification direction, which in this case was also parallel to the growth direction, for lengths up to several inches. The stereographic projections of the lamellae in these specimens had a spherical excess of less than 5 percent within any one section, and the plate-like lamellae were parallel to the solidification direction throughout the entire specimen within 5°.

*Example II*

Example I was repeated, except that the specimens, rather than being subjected to unidirectional solidification as in Example I, were merely superheated in a crucible to about 1000° C. to assure thorough melting, and then solidified by being permitted to cool to room temperature.

FIGURES 4(a) and 4(b) are photomicrographs of transverse and longitudinal sections, respectively, of the same microspecimen of the product produced.

As is apparent from a comparison of FIGURES 1, 2, 3(a) and 3(b) with FIGURES 4(a) and 4(b), the microstructure of the alloys produced in Example II is radically different from that produced in Example I.

Thus, in the alloy produced in Example II, crystal growth started at many points within the liquid, and a random overall structure was produced. As is shown in FIGURES 4(a) and 4(b), a typical random eutectic microstructure was formed. The phase particles, as is shown in FIGURES 4(a) and 4(b), are not parallel to each other, except within extremely limited areas, nor are the phases parallel or substantially parallel to a given direction.

The physical and mechanical properties of the alloy of Example I also differed from those in Example II. Thus the alloys produced in Example I had anistropic properties, i.e.: the properties were different in different directions, whereas the alloys produced in Example II had isotropic properties, i.e.: the same properties in all directions.

In preparing the eutectic alloys of the present invention having substantially parallel lamellae, it is important to control the thermal gradient (G) in the liquid at the interface and the solidification rate (R) during the unidirectional solidification.

The thermal gradient in the liquid is defined as the change in temperature in the liquid per centimeter of length in the liquid phase immediately in front of the advancing interface. As the liquid alloy is cooled, it will be appreciated that the temperature will change from that of the alloy at its melting point, or above, i.e. when the melt is superheated, to that of the solidified alloy. The thermal gradient is measured in accordance with the method described hereinabove in Example I.

As is shown in FIGURE 9(a) the specimen as it is drawn through the induction heater and subjected to cooling, contains a solid-liquid interface 24, the specimen below the interface being solid, as indicated at S, and above the interface being liquid, as indicated at L. As the specimen is pulled downwardly through the furnace, in the direction shown in the drawing, the interface will gradually move towards the top of the specimen. At commencement of operations, of course, the liquid phase can extend to the bottom of the specimen. The lamellae of the phases, as indicated schematically at 25 and 26 of FIGURE 9(a) grow normal to the interface 24, and also parallel to the direction indicated by the arrow in FIGURE 9(a), this direction in this instance corresponding to the solidification direction.

It is not, however, necessary, that unidirectional forming commence at the bottom of the specimen, nor need it be carried out over the whole length of the specimen. Nor is it necessary that the entire specimen be liquid above the interface. It is simply necessary that a solid-liquid interface be established, and that the solidification be controlled at said interface.

Although the direction of solidification has been described to be vertical, it should be understood that the solidification may be carried out in any direction desired. Thus, for example, the solidification direction may be horizontal, or may form any angle with the vertical.

Practical considerations may warrant the unidirectional solidification being carried out over only a portion of the specimen. In this event, those portions of the specimen not subjected to unidirectional solidification may be cut away from the portion that has undergone unidirectional solidification, if desired.

In any event, it will be apparent that the temperature of the liquid phase will vary with distance. This variation is called the thermal gradient, and is measured in ° C./cm. So far as the present invention is concerned, it is the thermal gradient in the liquid at the liquid-solid interface, e.g. 24 in FIGURE 9(a), that is important.

Interface 24 in FIGURE 9(a) is referred to as the crystallization front, and it is at this interface that the plate-like or rod-like lamellae form. The crystallization front may be transverse to the solidification direction, as shown in FIGURE 9(a), or it may form other angles with the solidification direction. Usually, however, the crystallization front will be transverse to the solidification direction.

In FIGURE 9(b), for example, the interface 24' is shown to form an angle with the solidification direction. The lamellae 25' and 26', however, grow normal to the interface 24'. In FIGURE 9(b), of course, the lamellae 25' and 26' do not grow parallel to the solidification direction, which is indicated by the arrow. Rather these lamellae are parallel to a direction which is normal to the solidification front 24'.

It will also be apparent that the liquid phase will solidify at a rate depending upon the temperature of the liquid, the rate of cooling, and the velocity of the specimen through the heating and cooling zones. The solidification rate, R, is measured in cm./hr.

The solidification rate and thermal gradient in the liquid at the liquid-solid interface undergoing solidification, i.e. the crystallization front, which are necessary to produce eutectic alloys having the lamellar microstructure described hereinabove, vary, depending upon the eutectic alloy being unidirectionally solidified. In general, it may be said that the solidification rate and the thermal gradient must be kept within a certain range, which range varies for each alloy being treated. The necessary solidification rate and thermal gradient will also depend to a certain extent on the impurities in the alloy.

The ratio of the thermal gradient, G, at the crystallization front to the solidification rate, R, is a good measure to assure formation of the parallel lamellae at the solid-liquid interface. In general, the ratio G/R may vary from about 0.1 to 1000, and is preferably between about 1 to 300° C./cm.$^2$/hr. The optimum value, of course, depends to a large extent upon the physical and chemical composition of the alloy being subjected to uni-directional solidification.

Although the method of forming unidirectionally solidified eutectic alloy compositions has been described in connection with cylindrical specimens, it should be understood that the shape of the specimen is not critical, and that the method is equally applicable to specimens having various shapes, such as cubes, polygons, toroids and the like. Care must be taken in unidirectionally solidifying such specimens, however, to insure that the liquid-solid interface undergoing solidification is maintained perpendicular to the desired lamellar orientation.

Although the direction of solidification has been described to be vertical, it should be understood that the solidification may be carried out in any direction described. Thus, for example, the solidification direction may be horizontal, or may form any angle with the vertical.

The invention in its broader aspects is not limited to the specific steps, methods, compositions, combinations and improvements described but departures may be made therefrom within the scope of the accompanying claims

What is claimed:

1. The method of forming anisotropic polyphase alloys having a microstructure of eutectic composition in which lamellae of one phase of the eutectic are imbedded in another phase of the eutectic, said lamellae being substantially parallel to a common direction over extended distances of up to several inches, said method comprising establishing a eutectic alloy which is selected from that class of eutectics which solidify in the form of three-dimensional lamellae of one of the phases imbedded in another phase, heating the composition to a temperature above the eutectic temperature to melt at least a portion thereof throughout its entire cross-sectional area and to establish a liquid-solid interface, unidirectionally solidifying at the liquid-solid interface by moving the interface in a direction such as to give the desired lamellar orientation, subjecting the interface to a cooling medium while the interface is moving in said direction to thereby solidify the alloy at said interface, and regulating the solidification rate and the thermal gradient of the liquid at the liquid-solid interface so that the ratio of the thermal gradient in the liquid phase at the solid-liquid interface to the solidification rate is between about 0.1 and 1000° C./cm.$^2$ hr. to thereby form upon solidification phase-lamellae which are normal to the liquid-solid interface and parallel to the growth direction over extended distances of up to several inches.

2. A metallurgical method of solidifying a polyphase eutectic alloy to form an anisotropic microstructure in which lamellae of one phase of the eutectic are imbedded in another phase, said lamellae being substantially parallel to a common direction over extended distances of up to several inches, said method comprising establishing a eutectic alloy which is selected from that class of eutectics which solidify in the form of three-dimensional lamellae of one of the phases imbedded in another phase, moving the alloy unidirectionally through a source of heat and a source of cooling at a predetermined rate, to establish a solid-liquid interface in the composition adjacent the source of heat, and solidifying the composition at said interface by moving the specimen past said cooling source, while regulating the temperature gradient at the solid-liquid interface and the rate of solidification so that the ratio of the thermal gradient in the liquid phase at the solid-liquid interface to the solidification rate is between about 0.1 and 1000° C./cm.$^2$/hr. to thereby form upon solidification phase lamellae which are normal to the liquid-solid interface and parallel to the growth direction over extended distances of up to several inches.

3. The method of claim 2 wherein said ratio is at least 1° C./cm.$^2$/hr.

4. The method of claim 2 wherein the solid-liquid interface is maintained perpendicular to the direction of motion.

5. The method of claim 2 wherein the solid-liquid interface forms an angle with the direction of motion.

6. The method of claim 2 wherein said rate is between about 1 and 300° C./cm.$^2$/hr.

7. Anisotropic polyphase alloy compositions characterized by a microstructure of a eutectic selected from that class of eutectics which solidify in the form of fine three-dimensional lamellae of one of the phases imbedded in another phase, said miscrostructure constituting three-dimensional rod-like lamellae of one phase of the eutectic imbedded in another phase of the eutectic, said rod-like lamellae being substantially parallel to one another and to a common direction over extended distances of up to several inches, the stereographic projections of the rod-like lamellae of the eutectic having a spherical excess of less than 20 percent.

8. Anisotropic polyphase alloy compositions of claim 7 which include proeutectic crystals distributed throughout the microstructure.

9. The anisotropic polyphase alloy compositions of claim 7 wherein the rod-like lamellae have a diameter of between about 0.2 and 20 microns and a length considerably greater than the diameter.

10. The alloys of claim 7 wherein the diameter of the rod-like lamellae is between about 0.02 and 10 microns.

11. The alloys of claim 7 wherein the length of the rod-like lamellae is between about 100 microns and 2 inches.

12. The alloys of claim 7 wherein the spherical excess of the stereographic projections of the rod-like lamellae is less than about 10 percent.

13. The alloys of claim 7 wherein the spherical excess of the stereographic projections of the rod-like lamellae is between about 0 and 5 percent.

14. Anisotropic polyphase alloy compositions characterized by a microstructure of a eutectic composition selected from that class of eutectics which solidify in the form of fine three-dimensional lamellae of one of the phases imbedded in another phase, said microstructure constituting three-dimensional plate-like lamellae of one of the phases imbedded in another phase, the three-dimensional plate-like lamellae being substantially parallel to each other within volumetric sections over extended distances of up to several inches, and the plate-like lamellae in adjacent volumetric sections being substantially parallel to a common direction over extended distances, the stereographic projections of the plate-like lamellae within a volumetric section having a spherical excess of less than 20 percent, and the plate-like lamellae in adjacent sections being parallel to a common direction over extended distances within about 30°.

15. Anisotropic polyphase alloy compositions of claim 14 which include proeutectic crystals distributed throughout the microstructure.

16. The alloys of claim 14 wherein the plate-like lamellae in adjacent sections are parallel to the common direction within about 5°.

17. The alloys of claim 14 wherein the stereographic projections of the plate-like lamellae within a volumetric section have a spherical excess of between about 0 and 5 percent.

18. The alloys of claim 14 wherein the stereographic projections of the plate-like lamellae within a volumetric section have a spherical excess of less than about 10 percent.

19. The alloys of claim 14 wherein the plate-like lamellae have a thickness between about 0.04 and 10 microns, a width greater than about 10 times the thickness, and a length between about 50 microns and 2 inches.

20. The anisotropic polyphase alloy compositions of claim 14 wherein the plate-like lamellae have a thickness of between about 0.2 and 20 microns, a width at least three times the thickness, and a length considerably greater than the width.

21. The method of forming an alloy having an anisotropic, polyphase microstructure of aluminum-copper eutectic composition in which three-dimensional plate-like lamellae of one phase of the eutectic are imbedded in another phase of the eutectic, said plate-like lamellae being substantially parallel to each other within volumetric sections over extended distances of up to several inches, and said plate-like lamellae in adjacent volumetric sections being substantially parallel to a common direction over extended distances, the stereographic projections of the plate-like lamellae within a section having a spherical excess of less than 20 percent, and the plate-like lamellae in adjacent sections being parallel to a common direction over extended distances within about 30°, which comprises establishing a copper-aluminum eutectic admixture, heating the admixture to a temperature above the eutectic temperature to melt a portion thereof throughout its entire cross sectional area and to establish a liquid-solid interface, unidirectionally solidifying at the liquid-solid interface by moving the interface in a direction such as to give the desired lamellar orientation, subjecting the interface to a cooling medium while the interface is moving in said direction to thereby solidify the alloy at said interface, and regulating the solidification rate and the thermal gradient of the liquid at the liquid-solid interface so that the ratio of the thermal gradient in the liquid phase at the solid-liquid interface to the solidification rate is between about 0.1 and 1000° C./cm.²/hr. to thereby form upon solidification phase lamellae which are normal to the liquid-solid interface and parallel to the growth direction over extended distances of up to several inches.

22. The method of forming an alloy having an anisotropic, polyphase microstructure of a eutectic composition which is a member selected from the group of eutectics consisting of Al—Cu, Ag—Cu, Cr—C, Ni—B, Cu—Sb, Ag—Al, Cd—Zn, Cu—P, Cd—Pb, Bi—Cd, Cu—O, Mg—Sn, Pb—Sn, Sn—Zn, Be—Ni and U—Ni, said microstructure characterized by lamellae of one phase of the eutectic imbedded in another phase, said lamellae being substantially parallel to a common direction over extended distances, the stereographic projections of the lamellae over said extended distances having a spherical excess of less than 20 percent, said method comprising establishing one of said eutectic members, heating the member to a temperature above the eutectic temperature to melt a portion thereof throughout its entire cross sectional area and to establish a liquid-solid interface, unidirectionally solidifying at the liquid-solid interface by moving the interface in a direction such as to give the desired lamellar orientation, subjecting the interface to a cooling medium while the interface is moving in said direction to thereby solidify the alloy at said interface, and regulating the solidification rate and the thermal gradient of the liquid at the liquid-solid interface so that the ratio of the thermal gradient in the liquid phase at the solid-liquid interface to the solidification rate is between about 0.1 and 1000° C./cm.²/hr. to thereby form upon solidification phase-lamellae which are normal to the liquid-solid interface and parallel to the growth direction over extended distances of up to several inches.

23. An anisotropic, polyphase alloy characterized by a microstructure of eutectic composition which is a member selected from the group of eutectics consisting of Al—Cu, Ag—Cu, Cr—C, Ni—B, Cu—Sb, Ag—Al, Cd—Zn, Cu—P, Cd—Pb, Bi—Cd, Cu—O, Mg—Sn, Pb—Sn, Sn—Zn, Be—Ni and U—Ni, said microstructure constituting lamellae of one phase of the eutectic imbedded in another phase of the eutectic, said lamellae being substantially parallel to a common direction over extended distances of up to several inches, the stereographic projections of the lamellae having a spherical excess of less than 20 percent over the extended distance of up to several inches.

24. An aluminum-copper eutectic anisotropic polyphase alloy, the microstructure of which is characterized by three-dimensional plate-like lamellae of one phase of the eutectic imbedded in another phase of the eutectic, said plate-like lamellae being substantially parallel to each other within volumetric sections over extended distances of up to several inches, said plate-like lamellae in adjacent volumetric sections being substantially parallel to a common direction over extended distances, the stereographic projections of the plate-like lamellae within a section having a spherical excess of less than 20 percent, and the plate-like lamellae in adjacent sections being parallel to a common direction over extended distances within about 30°.

References Cited in the file of this patent

UNITED STATES PATENTS

| 2,813,048 | Pfann | Nov. 12, 1957 |
| 2,879,189 | Shockley | Mar. 24, 1959 |
| 3,031,403 | Bennett | Apr. 24, 1962 |

FOREIGN PATENTS

| 194,444 | Germany | Jan. 10, 1958 |

OTHER REFERENCES

ASM "Liquid Metals and Solidification," Cleveland, Ohio, 1957, pages 278 and 280.

ASM "Liquid Metals and Solidification," Cleveland, Ohio, 1957, page 292.